Feb. 28, 1967 J. W. CORCORAN 3,306,104
DIRECTION SENSOR
Filed May 18, 1964

INVENTOR.
JOHN W. CORCORAN
BY
Fryer + Tjensvold
ATTORNEYS

United States Patent Office 3,306,104
Patented Feb. 28, 1967

3,306,104
DIRECTION SENSOR
John W. Corcoran, Redwood City, Calif., assignor to Beckman & Whitley, Inc., San Carlos, Calif., a corporation of Delaware
Filed May 18, 1964, Ser. No. 368,147
2 Claims. (Cl. 73—188)

The present invention relates to direction sensors in general and low friction, capacitance coupled, wind direction sensors in particular.

In the past wind direction sensors performed their functions satisfactorily by simply pointing an arrow in the direction of the wind. Today much more is required. The field of meteorology has advanced to a stage where it is now an exacting and complex science which like almost all other fields of science today require elaborate instrumentation for data gathering purposes. While the direction of the wind is still of prime concern to the meteorologist, it is no longer sufficient to only know the direction of the wind at those locations which a meteorologist can personally inspect. In order to predict possible future weather conditions the meteorologist must know existing and past weather conditions at various locations in the geographical area under consideration. For this purpose there are many un-manned weather stations located throughout the world wherein weather sensing instrumentation is located. It follows, of course, that in order for the weather stations to perform their function it is necessary to transduce the various weather conditions at the location into some sort of a signal which can be transmitted to a central data gathering station which may be many miles from the weather stations themselves. It is this data—gathered from many locations—which the meteorologists desire.

Because so many un-manned weather stations are in remote locations, field service reliability of the instrumentation employed to sense weather conditions is of prime concern. Thus, while an instrument may be a highly accurate direction sensor in the laboratory if it cannot withstand the rigorous conditions which exist in actual field use it is unsatisfactory as a data gathering device for an un-manned weather station. On the other hand, an instrument which is exceedingly durable is of little use if it has poor accuracy or provides a signal which cannot be easily transmitted to a distant location.

The present invention teaches a unique form of direction sensing, employing capacitance coupling, which forms the essential portion of the wind direction sensor described in detail below. By employing a unique direction sensitive capacitor the invention makes it possible to transduce the direction of the wind into an electrical signal without requiring any mechanical connection between the shaft of the wind vane employed and the rest of the sensing device, other than a bearing necessary to rotatably support the vane shaft. By eliminating all mechanical connections other than the shaft bearing component, failure due to frictional wear is completely eliminated and the amount of drag on the vane shaft is reduced to a bare minimum thereby increasing the sensitivity of the vane to a maximum.

Accordingly, it is an object of the present invention to provide a variable capacitor having characteristics which are functionally dependent upon the relative angular position between the plates which form the capacitor.

It is another object of the present invention to provide a wind direction sensor which provides an electrical signal which contains information as to the direction of the wind wherein the sensor includes a wind vane the shaft of which experiences no frictional drag other than that caused by the shaft support bearing.

Another object of the present invention is to provide a wind direction sensor which provides electrical signals the relative phase of which contains the information desired.

Further and more specific objects and advantages of the invention are made apparent in the following specification wherein a preferred form of the invention is described by reference to the accompanying drawings.

Figure 2:
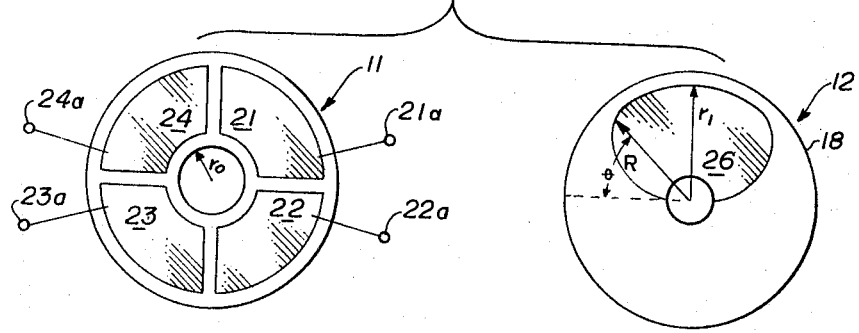
FIG. 2 is a plan view of the capacitor plates which form the variable capacitor employed in transducing direction to an electrical signal.

As mentioned above, the portion of the present invention which makes possible a wind direction sensor having outstanding characteristics is a variable capacitor wherein the relative angular position between the plates of the capacitor gives rise to a changing capacitor characteristic. More important, the variable characteristic of the capacitor varies proportionally with changes in the relative angular position between the capacitor plates. This unique capacitor is best explained with reference to FIGS. 2 and 3. The capacitor includes a stator 11 and a rotor 12 with the rotor fixed to a shaft 13 which is rotatably secured in a bearing 14. The shaft 13 has an angular position dependent upon the angular position of a wind vane 16 which is rigidly secured thereto. Thus, as the direction of the wind changes so also does the direction of the vane 16 and shaft 13, with an accompanying change in the relative angular position of the capacitor rotor 12.

Stator 11 is held stationary relative to shaft 13 and rotor 12 by mounting means shown generally at 15. The stator includes four electrically separate capacitor plate segments 21, 22, 23 and 24 each having the shape of one quadrant of an annulus and arranged in a circular pattern. Physically, stator 11 can be realized by four metal plates having the prescribed shape secured to a disc 17 formed from a non-conductive material. It is also possible to realize stator 11 in other ways, such as by depositing metal onto a non-conductive disc so as to form the desired stator segments. Each of segments 21–24 has associated therewith an electrical connection terminal 21a, 22a, 23a and 24a, respectively.

Figure 3:
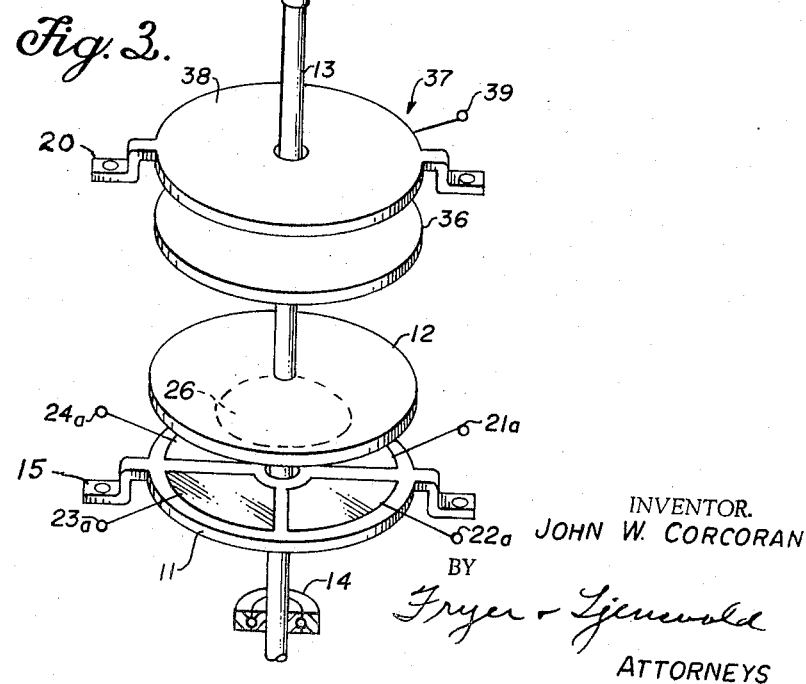
FIG. 3 is an isometric, semi-schematic illustration showing the physical relationship between the various components which form the wind direction sensor of the present invention.

The rotor 12 has a single capacitor plate 26 which may be physically realized by plate 26 being secured to a disc of non-conductive material 18, or by metallic disposition onto a non-conductive plate, or simply by a metal plate having the shape of plate 26. When operatively disposed as shown in FIG. 3, plate 26 is in facing relation to the segments 21–24 so as to form a capacitor therewith and provide electrical continuity between the stator 11 and the rotor 12. In order that the relative angular position between the rotor 12 and the stator 11 give rise to the desired functional relationship it is necessary that the rotor plate 26 be described by the formula $$R^2 = r_0^2 + r_1^2 \sin \theta$$

where R is the radius at angle $\theta$, $r_0$ is the minimum stator radius and $r_1$ is a constant determined by the maximum rotor diameter.

Figure 1:
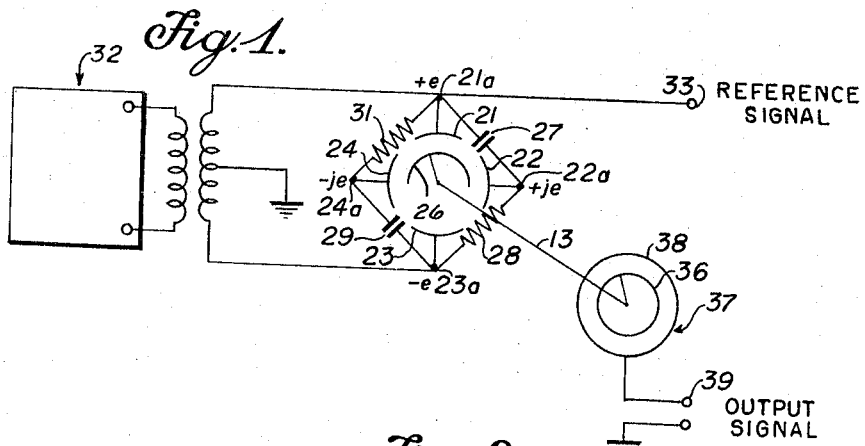
FIG. 1 is an electrical schematic diagram of the wind direction sensor of the present invention.

Referring now to FIG. 1, stator terminals 21a and 22a are electrically connected by means of a capacitor 27, terminals 22a and 23a are electrically connected by means of a resistor 28, terminals 23a and 24a are electrically connected by means of a capacitor 29 and terminals 24a and 21a are electrically connected by means of a resistor 31. Thus, the capacitor plate segments of the stator 11 are electrically situated within a phase shifting network formed by capacitors 27 and 29 and resistors 28 and 31. Electrical energy is supplied to the phase shifting network at terminals 21a and 23a by an A.C. source 32 operating at a frequency commensurate with the value of the capacitors involved (e.g., 1,000 cycles per second). Assuming that the output of the source 32 is some value $e$, the voltage at terminal 21a is equal to $+e$, the voltage at 22a is $+je$, the voltage at terminal 23a is $-e$, and the voltage at 24a is $-je$. Thus, the phase shifting network is operative to impose a voltage on each of capacitor plate segments 21–24 wherein the phase of the voltage progresses 90° per segment around the circular pattern.

If the voltage at terminal 21a is chosen as a reference signal, it will be found upon application of the teachings herein that the phase of the voltage signal on capacitor plate 26 will change proportionally as the angular position of plate 26 changes with respect to the position of stator 11. Thus, the reference signal at terminal 33 and the signal on plate 26 give information as to the direction of the wind vane 16.

Before this information of direction, which has been effectively transduced into an electrical signal, can be transmitted to some remote location, however, it is necessary to transfer the signal on the rotor 12 to some stationary terminal. As explained above, this is most effectively done without a brush type connection or other frictional connection so as to avoid placing additional drag on the shaft 13. Accordingly, shaft 13 has secured thereto one plate 36 of a capacitor 37 while the other plate of the capacitor is axially aligned with plate 36 and in facing relation thereto but secured by mounting means 20 to be relatively stationary. Capacitor plates 36 and 38 are similar discs which have uniform angular geometry such that the relative position between the plates 36 and 38 has no effect on the overall capacitance value of the capacitor 37. The rotor 12 of the variable capacitor is electrically connected along shaft 13 to the plate 36 of capacitor 37. Thus, the electrical signal which exists on capacitor plate 26 is conducted to plate 36 and from there to plate 38 to which is attached an output terminal 39. Thus, a comparison between the phase of the signal at terminal 39 and the phase of the signal at reference terminal 33 provides the desired information concerning the direction of wind vane 16.

The capacitance sensor described above has many advantages over potentiometer sensors. These advantages include the elimination of any awkward gap in the signal, and the elimination of friction contacts which give rise to wear and resulting failures. The output signal at terminal 39 and the references signal at terminal 33 can be sent over a transmission line where the two waveforms can be combined by use of Schmidt trigger circuits to generate a pulse width modulated signal the ratio of whose "on" time to period gives the angular position data. Such a signal might be indicated on a simple milliammeter movement since the average D.C. value is a linear function of angular position. Alternate methods of read-out are of course also possible.

One of the outstanding features of the present invention is the form in which the information from the sensor is made available. As set forth in detail above, the final output from the sensor is in the form of a phase modulated signal. This type of signal has many advantages over magnitude modulated signals; the main one being the ability to transmit phase modulated signals over long transmission lines without the loss of accuracy or quality. Thus, it is seen that the present invention not only provides a wind measuring sensor of outstanding mechanical characteristics but one which also possesses highly desirable and unique electrical characteristics as well.

I claim:

1. In a device for transducing angular shaft position to an electrical signal the combination comprising;
   a first capacitor plate including four electrically separate conducting segments having the shape of quadrants of an annulus and disposed in a circular pattern;
   means imposing an A.C. electrical signal on the conducting segments such that the phase of the signal progresses 90° per segment around the circular pattern;
   a second capacitor plate disposed on the shaft in coaxial facing relation to said first plate and angularly movable relative thereto, said second plate having the geometric form described by
   $$R^2 = r_0^2 + r_1^2 \sin \theta$$
   where $R$ is the radius of said second plate at angle $\theta$, $r_0$ is the minimum radius of the conducting segments of said first plate, and $r_1$ is a constant determined by the maximum diameter of said second plate;
   a third capacitor plate mounted on the shaft in spaced facing relation to said second capacitor plate and electrically connected thereto;
   a fourth capacitor plate in spaced facing relation to said third capacitor plate and fixedly secured relative thereto; and
   an output terminal electrically connected to said fourth capacitor plate.

2. In a wind direction sensor the combination comprising;
   a wind vane having a rotatably mounted shaft;
   a first capacitor plate including four electrically separate conducting segments having the shape of quadrants of an annulus and arranged in a circular pattern;
   a second capacitor plate secured to the rotatably mounted shaft to rotate therewith, said second plate having the geometric form described by
   $$R^2 = r_0^2 + r_1^2 \sin \theta$$
   where $R$ is the radius of said second plate angle $\theta$, $r_0$ is the minimum radius of the conducting segments of said first plate, and $r_1$ is a constant determined by the maximum diameter of said second plate;
   said first capacitor plate disposed in relatively fixed facing relation to said second plate;
   means imposing an A.C. electrical signal on the conducting segments of said first plate such that the phase of the signal progresses 90° per segment around the circular pattern;
   a third capacitor plate secured to the shaft and electrically connected to said second capacitor plate;
   a fourth capacitor plate in spaced facing relation to said third plate and fixedly secured relative thereto; and
   an output terminal electrically connected to said fourth capacitor plate.

References Cited by the Examiner

UNITED STATES PATENTS

| 685,590 | 10/1901 | Faltermayer | 73—188 |
| 2,001,282 | 5/1936 | Nyman | 317—249 |
| 2,191,315 | 2/1940 | Guanella | 317—249 X |
| 2,480,187 | 9/1949 | Gamertsfelder | 317—249 X |
| 2,519,773 | 8/1950 | Lee et al. | 317—249 X |
| 2,534,505 | 12/1950 | Ergen | 317—249 X |

OTHER REFERENCES

Dummer and Nordenberg, Fixed and Variable Capacitors, McGraw-Hill, New York, 1960, pages 247–250 relied on.

Telemetry Transducer Handbook, vol. I, July 1961, Radiation Incorporated, Orlando, Florida.

RICHARD C. QUEISSER, *Primary Examiner.*

J. J. SMITH, *Assistant Examiner.*